United States Patent [19]

Johansson et al.

[11] 4,200,832

[45] Apr. 29, 1980

[54] OVERLOAD DETECTING SCHEME FOR AN ELECTRIC PROPULSION SYSTEM FOR TRACTION VEHICLES

[75] Inventors: August V. Johansson; Joseph D. Schneider, both of Erie, Pa.

[73] Assignee: General Electric Company, Erie, Pa.

[21] Appl. No.: 566,888

[22] Filed: Apr. 10, 1975

[51] Int. Cl.$^2$ .................. B60L 11/02; H02H 7/08
[52] U.S. Cl. ..................... 322/59; 290/14; 318/139; 361/20
[58] Field of Search .................. 322/28, 59, 23, 36, 322/84, 19; 290/14; 317/13 R, 22, 31, 33 VR; 340/248 R, 248 P, 253 Y; 318/158, 139; 324/158 M, 158 G

[56] References Cited

U.S. PATENT DOCUMENTS

| | | | |
|---|---|---|---|
| 3,551,685 | 12/1970 | Corry | 318/158 X |
| 3,705,331 | 12/1972 | South et al. | 317/13 R |
| 3,838,294 | 9/1974 | Leete | 340/248 P |
| 3,858,108 | 12/1974 | Bray | 322/28 |
| 3,902,105 | 8/1975 | Delaney et al. | 318/139 X |
| 3,914,675 | 10/1975 | Konrad | 317/13 R |
| 3,938,005 | 2/1976 | Cummins | 322/28 X |

*Primary Examiner*—Robert J. Hickey
*Attorney, Agent, or Firm*—A. S. Richardson, Jr.

[57] ABSTRACT

For detecting electrical overloads in a traction vehicle propulsion system wherein the output of a prime mover-driven electric generator is controlled by varying the on-off duty cycle of an intermittently conductive switch connected in series with a field winding of the generator excitation means, monitoring means is connected across the field switch to produce an output signal in response to the field switch being continuously conductive for an abnormally long period of time which is indicative of an over-excited condition.

9 Claims, 3 Drawing Figures

OVERLOAD DETECTING SCHEME FOR AN ELECTRIC PROPULSION SYSTEM FOR TRACTION VEHICLES

BACKGROUND OF THE INVENTION

This invention relates generally to electric propulsion systems for traction vehicles, and it relates more particularly to the detection of electrical overloads in such a system.

Propulsion systems for traction vehicles such as locomotives commonly use a diesel engine prime movor to drive electric generating means for supplying energy to traction motors. The power output of the generating means is regulated or varied by suitably controlling the strength of its field excitation and the speed of the prime mover. In systems such as those disclosed in U.S. Pat. No. 3,105,186—Zelina and in patent application Ser. No. 355,800—McSparran filed Apr. 30, 1973, and assigned to the General Electric Company (U.S. Pat. No. 3,878,400), the generator excitation means comprises a field winding connected for energization to an electric current supply in circuit with an intermittently conductive switch (e.g., a controllable semiconductor device), whereby the average level of excitation can be varied as desired by appropriately varying the on-off duty cycle of the field switch. This form of regulation is popularly known as time ratio control (TRC) or pulse width modulation (PWM), and its advantages are explained in earlier Zelina patents such as U.S. Pat. Nos. 2,861,237 and 2,866,944. Preferably the parameters are chosen so that under normal conditions the field switch always operates in a pulsing mode, with its per cycle proportion of "on" time being varied by the associated controls so as effectively to vary the level of excitation between predetermined maximum and minimum limits.

Such a propulsion system can be electrically overloaded if, due to a malfunction of the field switch or of its controls, full excitation current is supplied continuously to the field. In this abnormal event, the field excitation will exceed the aforesaid normal maximum limit, and as a result the dynamoelectric machines are overstressed and the diesel engine speed is undesirably reduced below that called for. If such a condition persists very long, the main components of the system will be exposed to a serious risk of damage. Accordingly, prompt and effective protective action is desired in response to abnormal overloads.

One approach to providing protection against a hazardous overload involves detecting its occurrence by sensing abnormally high values of generator current or voltage or their product. However, the hardware for doing this tends to be relatively large and cumbersome and expensive, and often its ability to perform reliably under a variety of failure modes is undesirably limited.

Another method of overload protection is to connect the intermittently conductive field switch in parallel with the field winding of the excitation means. (See the above-referenced McSparran patent.) Consequently, in the event of a fault or failure of the field switch or of its controls of a nature that causes a continuous short circuit across the field winding, all current will be diverted from the field winding, thereby unloading rather than overloading the system. While this arrangement is relatively "failsafe" and has been generally satisfactory in practice, it has several recognizable shortcomings. The person operating the propulsion system may have difficulty perceiving a loss of power caused by the described abnormality, and therefore he may fail to initiate timely corrective action. If inadvertently the field switch were continuously turned "off" as a result of a malfunction or a misoperation of its control, thereby permitting abnormally high excitation current to flow in the parallel field winding, there is no means for detecting this potentially harmful condition. Furthermore, no means is provided for differentiating between a hazardous overload caused by a continuously turned-off switch and a relatively harmless condition which may exist if the switch is only temporarily off.

SUMMARY OF THE INVENTION

A general objective of this invention is to provide an improved overload detecting scheme for the electric propulsion system of a traction vehicle.

It is another object of the invention to provide an electrical overload detecting scheme which discernably responds to any one of a variety of different abnormal conditions in such a propulsion system, including a shorted field switch, a malfunction in the field switch control, and an excessive demand for power.

A further object is the provision of such a scheme capable of detecting a potentially harmful overload condition while riding through short-term disturbances.

In carrying out this invention in one form, an intermittently conductive switch is connected in series with a shunt field winding of an exciter for a prime mover-driven generator which supplies electric power to the traction motors of a self-propelled vehicle, and the proportion of time that the switch is conductive is suitably controlled so as to vary the level of generator excitation as desired between predetermined normal maximum and minimum limits. If the field switch were conductive continuously instead of intermittently, the generator would be overexcited and the power components of the vehicle propulsion system would be electrically overloaded. To detect this unsafe condition, monitoring means is connected across the field switch for producing an output signal in response to the field switch being continuously conductive for an abnormally long period of time. In a preferred embodiment, the detecting scheme also includes means responsive to the production of the aforesaid output signal for automatically reducing the level of field excitation.

The invention will be better understood and its various objects and advantages will be more fully appreciated from the following description taken in conjunction with the accompanying drawings.

DESCRIPTION OF THE PREFERRED EMBODIMENT

Figure 1:
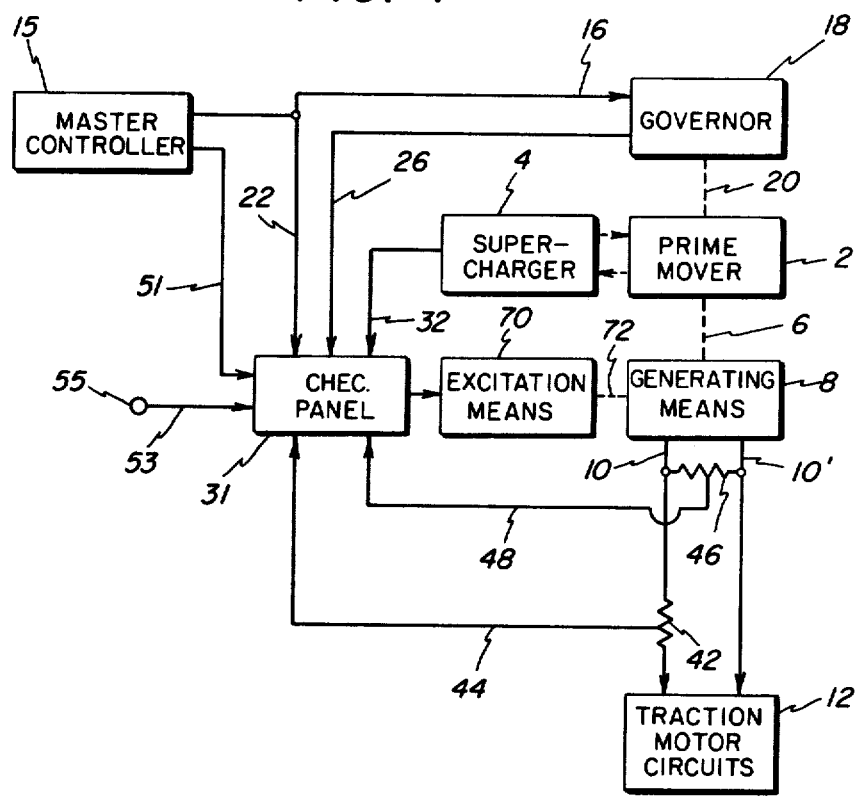
FIG. 1 is a functional block diagram of an electric propulsion system for a traction vehicle, which system includes means for controlling the excitation of electric generating means.

Referring now to FIG. 1, there is shown in functional block form a simplified schematic of a traction vehicle propulsion system of the kind more fully shown and described in the above-referenced McSparran patent. In the illustrated system the output shaft 6 of a diesel engine prime mover 2 is coupled to a rotating dynamoelectric machine which may comprise either a d-c generator or an a-c alternator and which is herein designated generically as electric generating means 8. Prime mover speed, and thus its available horsepower, is determined by a governor 18 under the control of an associated throttle in the Master Controller block 15. Line 16 represents the coupling between the throttle control and the governor, and line 20 represents the governor output controlling the fuel supplied to the diesel engine 2. Associated with the diesel engine is a supercharger 4 typically comprising a gas turbine into which the engine exhaust gases are discharged and a centrifugal blower which compresses the engine intake air, as indicated symbolically by the dashed-line pointers in FIG. 1.

The electrical output of the generating means 8 is coupled by lines 10 and 10' to a plurality of dynamoelectric machines which comprise conventional traction motors, represented generally in FIG. 1 by the block 12 labeled "Traction Motor Circuits." The rotors of the traction motors are mechanically coupled to wheels of a vehicle for propelling or retarding the same. Motor speed depends on the magnitude of the generator output voltage, and this in turn is determined by the speed of the engine 2 and the excitation level prevailing.

The excitation means of the generating means 8 conventionally comprises an associated excitation generator 70 driven by the same engine 2 that drives the main generating means 8. The excitation generator 70 supplies a controlled amount of unidirectional current to excite the field winding of the main generating means 8 to which it is connected by line 72. The level of excitation in the main generating means 8 can be varied as desired between predetermined normal maximum and minimum limits by suitably controlling the energization of a shunt field winding of the exciter 70. For this purpose a Constant Horsepower Excitation Control Panel 31 is provided.

In normal operation the control panel 31 is effective to control the power output of the generating means 8 so as to prevent voltage and current magnitudes from exceeding certain limits and additionally to prevent their product from exceeding the available power output of the diesel engine 2. Toward this end a variety of signals are fed to the panel 31, including on line 22 a throttle position signal from the Master Controller 15, on line 26 a governor load control signal representative of the power demand, on line 32 a turbo speed signal representative of the rotational speed of the supercharger 4, on line 44 a current feedback signal which varies with the output current of the generating means 8 as measured by a suitable current sensor 42 in the line 10, and on line 48 a voltage feedback signal which varies with the potential of the generator output as measured by a suitable voltage sensor 46 connected across lines 10 and 10'. The excitation control panel 31 additionally receives a dynamic braking effort signal from the Master Controller 15 over line 51, and it receives, by way of a line 53 and a terminal 55 which is coupled to the traction motor circuits 12, a feedback signal representative of motor armature current during dynamic braking (retarding). From these input signals the panel 31 derives a control signal which determines the energization of the shunt field of the exciter 70 and the exciter output in turn determines the field excitation of the main generating means 8. The highest permissible level of excitation is called for by the control signal. In operation, this level is regulated as necessary to keep the actual current, voltage and power output of the main generating means from exceeding desired limits which are normally referenced to the throttle position (or to the turbo speed signal, if lower than the throttle position signal, as is taught by McSparran) but which are also influenced by the governor load control signal and, during dynamic braking, by the braking effort signal. The manner in which excitation is varied in the illustrated embodiment of the invention is shown in FIG. 2 which will now be described.

Figure 2:
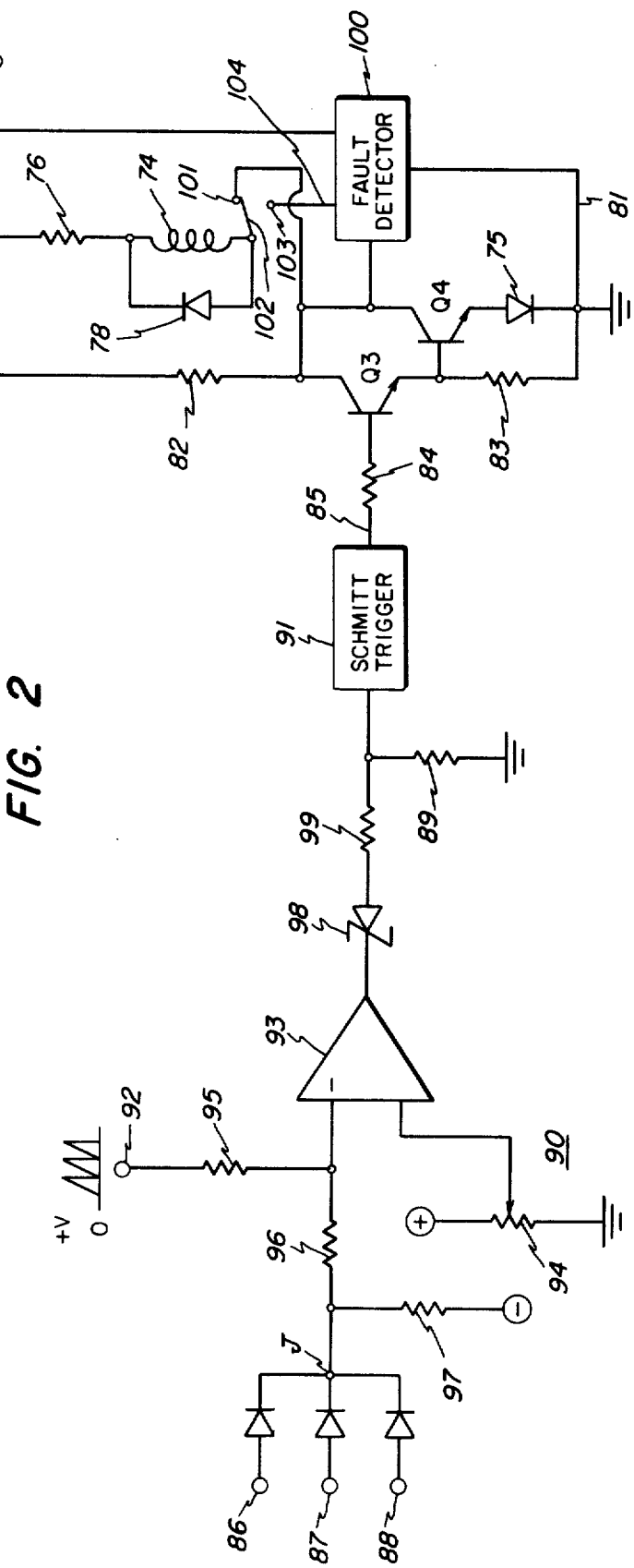
FIG. 2 is a schematic circuit diagram, partly in block form, of those parts of the FIG. 1 excitation means and its controls which are relevant to an understanding of the present invention.

In FIG. 2 the reference number 74 designates a shunt field winding of the d-c generator which excites the field of the main generating means 8 of the traction vehicle propulsion system. The field 74 is connected for energization to a source of relatively constant electric power comprising a pair of d-c supply busses 80 and 81, with the potential of bus 80 being positive (+74 volts) with respect to the common bus 81 (shown at ground potential). The winding 74 is connected between the positive bus 80 and the common bus 81 by means of a unidirectional current conducting circuit comprising, in series, a diode 75, a variable impedance means Q4, and a current limiting resistor 76. The field 74 is shunted by a free wheeling diode 78 as shown, and between the field 74 and the variable impedance means Q4 there is a movable contact 102 of an exciter field relay which contact in its high position engages a terminal 101 to complete the series connection between the field 74 and the variable impedance means Q4 (as is shown in FIG. 2) or in its low position engages an alternative terminal 103 for connecting the field to a reduced excitation circuit 104 (which will be described hereinafter in connection with FIG. 3).

By varying the impedance of the series impedance means Q4, the amount of current that flows from the positive bus 80 of the d-c power source through the exciter field 74 can be correspondingly varied so as to adjust the output of the exciter 70 as desired. The exciter output in turn determines the level of field excitation of the main generating means 8 and thereby controls its electrical output.

Preferably the variable impedance means Q4 is in the form of intermittently conductive switching means whose proportion of conductive time is variable. Hereinafter this switching means will usually be referred to as the field switch. In the illustrated embodiment, the field switch is an NPN transistor Q4 which is connected in a Darlington configuration with a companion transistor Q3. Both transistors have their collectors connected directly to each other and, through a resistor 82, to the +74 volts bus 80. The emitter of the transistor Q3 is connected to the base electrode of the transistor Q4 and, through a resistor 83, to the common bus 81. The base electrode of the transistor Q3 is connected through a resistor 84 to a line 85 which is energized by a control signal normally characterized by a rectangular waveform having a relatively constant frequency (e.g., 200 Hertz) but variable pulse width. During periods when the control signal is high (i.e., positive with respect to common), the Darlington pair of transistors Q3 and Q4 is fully turned on, whereas during the spaces between such periods, the pair is completely turned off. The relative duration or width of successive positive pulses of the control signal, and hence the per cycle proportion of on time of the field switch Q4, is modulated as a function of an error voltage appearing at a comparison junction J.

As is indicated in FIG. 2, the comparison junction J receives input signals from a plurality of terminals 86, 87, and 88. The various input signals which are applied to these terminals are developed in the excitation control panel 31 previously described. In a practical embodiment, by way of example, the input signal applied to terminal 86 is representative of the difference between actual and reference values of the voltage output of the main generating means 8, the input signal applied to the terminal 87 is representative of the difference between actual and reference values of output current in lines 10, 10', and the input signal applied to the terminal 88 is representative of the difference between actual and reference values of generator output power. In each case the magnitude of the representative input signal, measured with respect to the common potential, reflects the amount by which the actual value of the associated parameter differs from a limit established by its reference value, and, so long as the actual value is lower than the limit, the polarity of this signal is relatively negative. The three terminals 86, 87, and 88 are respectively connected to the junction J via isolating diodes which perform an OR logic function so that the error voltage is determined by whichever input signal has the least negative potential.

The error voltage at the junction J controls a modulator 90 which cyclically activates a Schmitt Trigger 91 or the like whose output is the periodic control signal on line 85. The modulator 90 comprises a suitable sawtooth waveform source 92 and an operational amplifier 93 used in a differential mode. The non-inverting input of the op amp 93 has a predetermined bias which is virtually at common potential; for adjustment purposes the bias voltage is actually taken from the slider of a potentiometer 94 connected between a supply voltage terminal of positive potential and common (ground). The inverting input of the op amp 93 is connected through a resistor 95 to the source 92 of sawtooth voltage waves, and it is also connected through a resistor 96 to the comparison junction J which in turn is connected through a resistor 97 to a supply voltage terminal of negative potential with respect to common.

The sawtooth voltage shown schematically in FIG. 2 can be obtained from any suitable oscillator or generator such as, for example, a unijunction transistor and capacitor combination wherein the capacitor is charged by a constant current until the emitter peak point voltage is reached, whereupon the transistor is triggered and abruptly discharges the capacitor, thereby automatically resetting the oscillator and permitting the next cycle of operation to begin. Preferably the operating frequency is of the order of 200 Hz. During each cycle of operation, the voltage at source 92 increases linearly with time from a low initial value to a positive peak and then suddenly collapses to its initial value. The resulting sawtooth wave has an amplitude of V volts.

In the modulator 90 the inverting input of the op amp 93 depends on the algebraic sum of the sawtooth voltage at the source 92 and the error voltage at the comparison junction J. This sum is divided by the resistors 95 and 96. So long as the potential at the junction of these resistors remains below (less positive than) the bias of the non-inverting input of the op amp 93, the output of this amplifier is high (i.e., positive with respect to common). On the other hand, if the junction potential is above the bias voltage the op amp 93 has a low (i.e., negative) output state.

The control circuit parameters are selected and coordinated so that the junction potential of the resistors 95 and 96 will be just slightly above the bias voltage when the initial low value of the sawtooth voltage is summed with a predetermined small error voltage magnitude which is obtained if the least negative input signal corresponds to an approximately zero difference between the actual value of voltage, current or power and its referenced limit, whereby the output of op amp 93 is continuously low, and so that the junction potential will be just slightly below the bias voltage when the final peak value of the sawtooth voltage is summed with a predetermined large negative error voltage which is obtained if the actual values of all three of the aforesaid quantitites are appreciably lower than their respective limits, whereby the amplifier output is continuously high. For any magnitude of error voltage which lies in an active range between these predetermined small and large magnitudes, the amplifier 93 begins each modulator cycle in a high output state and then is switched to a low output state as soon as the junction potential rises above the bias voltage due to the sawtooth voltage increasing in a positive-going sense. Once switched, the low output state is continued during the remainder of the +V excursion of the sawtooth wave, and at the conclusion of each cycle the sawtooth generator automatically resets and the amplifier output thereupon reverts to its initial high state.

Since the larger (more negative) the error voltage the later the amplifier 93 is switched in each cycle to its low output state, it will be apparent that the period of high output is proportional to the magnitude of the error voltage in its active range. If the least negative one of the input signals being supplied to the terminals 86, 87, and 88 is more negative than a certain quiescent value which is determined by the negative supply voltage and the ohmic ratio of the resistors 96 and 97, then all three of the isolating diodes associated with these terminals will be reverse biased and the error voltage at the comparison junction J will have that quiescent value. The quiescent value of error voltage is larger than said predetermined large magnitude and hence is outside of the aforesaid active range, and when it exists the amplifier 93 continuously is in its high output state.

The output of the amplifier 93 of the modulator 90 is applied through a zener diode 98 and a resistor 99 to the input of the Schmitt Trigger 91, and a resistor 89 is connected between this input and common. Each time the modulator switches from low to high output states, the Schmitt Trigger 91 provides a discrete positive control signal, i.e. a pulse, on the line 85, thereby turning on the intermittently conductive series field switch Q4. When the modulator switches from high to low output states, this control signal is discontinued and the field switch is turned off. The average value of current flowing through the exciter field 74 varies with the per cycle proportion of on time of the field switch Q4. The ohmic value of the current limiting resistor 76 in series with the field 74 is chosen so that a desired normal maximum level of excitation can be realized at maximum permissible temperature with the field switch being pulsed on for a relatively high proportion (e.g., more than 75% but less than all) of each cycle. This condition is obtained for error voltages of relatively large magnitudes within the aforesaid active range. As the actual output of the generating means 8 approaches the desired limit for a given throttle position, the error voltage will decrease (become less negative) so as to reduce the per cycle conductive proportion of the field switch Q4, and a zero error voltage will keep the field switch turned off continuously.

If the series field switch Q4 were to fail in a shorted (turned on) mode, it would begin to conduct continuously, in which state it offers negligible impedance to the exciter field current which consequently turns fully on and permits the main generator field excitation to exceed its predetermined normal maximum level. A fault detector 100 is provided to initiate appropriate protective action in the event of such overexcitation. In accordance with the present invention, the fault detector 100 is connected across the field switch Q4, and in its preferred form this detector is constructed and arranged as shown in FIG. 3 which will now be described.

Figure 3:
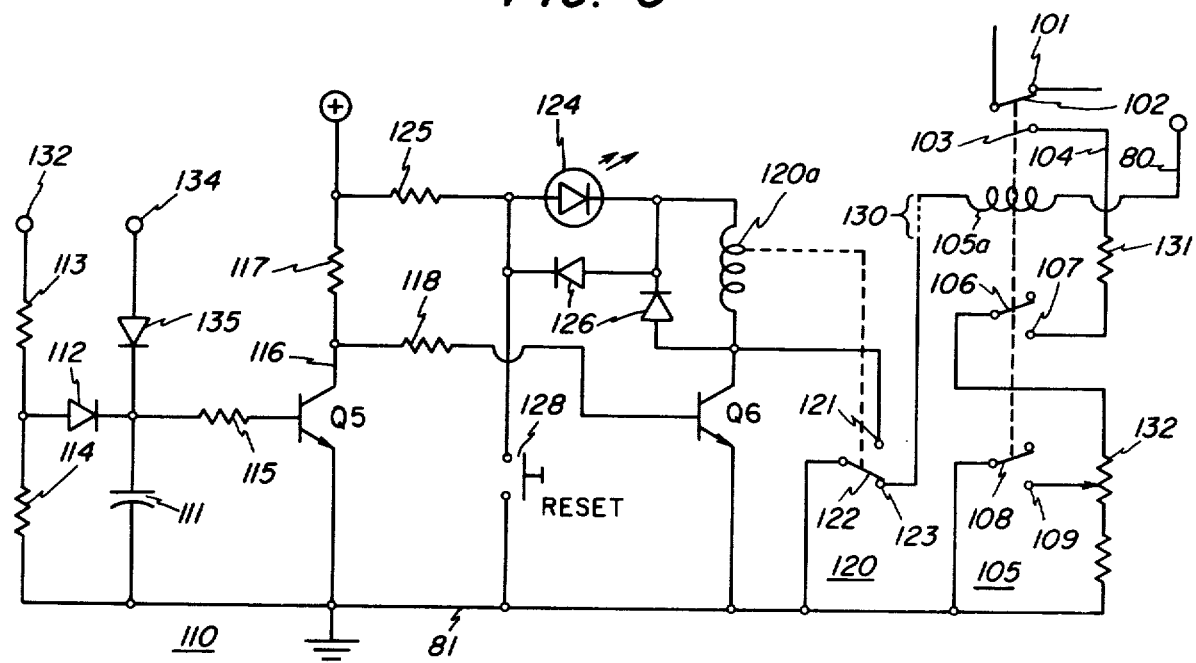
FIG. 3 is a schematic circuit diagram of a preferred embodiment of an overload detecting scheme incorporating the present invention, which scheme in FIG. 2 is shown as a single block labeled "Fault Detector."

As is indicated in FIG. 3, the fault detector includes monitoring means 110 which comprises a normally turned on NPN transistor Q5 and a capacitor 111. The emitter of transistor Q5 and the relatively negative plate of the capacitor 111 are both connected to the common potential bus 81. A circuit including a resistor 115 connects the base electrode of the transistor Q5 to the positive plate of the capacitor 111, and the collector of this transistor is connected by way of a line 116 and a resistor 117 to a supply voltage terminal of positive polarity. The juncture of the resistor 115 and the capacitor 111 is connected through a unidirectional circuit element (a diode) 112 to the juncture of a pair of voltage dividing resistors 113 and 114 which in turn are connected between a terminal 132 and common.

The terminal 132 in FIG. 3 is intended to be the collector of the field transistor Q4 shown in FIG. 2, and thus the capacitor 111 is connected in parallel with Q4 for accumulating a charge from a reduced portion (e.g., approximately 50%) of its collector voltage when turned off. As can be seen in FIG. 3, the diode 112 is poled to conduct current during those periodic intervals when the potential at the terminal 132 is high (positive) due to the field switch being non-conductive. This input not only forward biases the base-emitter junction of the transistor Q5 but also charges the capacitor 111 which has energy storing capability. Throughout each of the intermittent conductive periods of the field switch Q4, the capacitor 111 discharges a portion of its stored energy through the resistor 115, and the forward bias of the transistor Q5 is sustained by this discharge. The ohmic value of the resistor 115 in the discharge current path is appreciably higher than (e.g., approximately 15 times) that of the resistor 113, and hence the time constant of the capacitor discharging circuit is correspondingly longer than the capacitor charging time constant.

So long as the capacitor 111 remains at least partially charged and its discharge current is in excess of a relatively small threshold magnitude, the transistor Q5 is continuously turned on and there is negligible potential on line 116 with respect to common. On the other hand, if the charge on the capacitor were to decrease to a predetermined level too low to sustain the forward bias of transistor Q5, this transistor would then turn off and the potential of line 116 would rise to a higher positive level. The production of the positive voltage on line 116 indicates that an undesired overload condition has been detected, and thus this voltage can be regarded as the output signal of the monitoring means 110.

It will be apparent that the monitoring means 110 is operative to produce the output signal on line 116 whenever the field switch Q4 is continuously conductive, a condition in which there are no periodic intervals of high voltage at terminal 132 for forward biasing the transistor Q5 and replenishing the charge on the capacitor 111. When the monitoring means 110 is thus operative, the capacitor 111 discharges relatively slowly to effect a delay in the production of the output signal for at least a predetermined length of time. In one practical embodiment of the invention, the discharging time constant was chosen so that the minimum delay time was approximately 4 seconds. Delay times less than half this long are still appreciably longer than the period (e.g., 5 milliseconds) of the sawtooth voltage associated with the modulator 90 (FIG. 2), and therefore the output signal is delayed until many consecutive cycles have elapsed without the field switch Q4 being turned off. If the field switch resumes its normal pulsing mode of operation at any time prior to the actual production of the output signal by the monitoring means 110, the capacitor 111 is immediately fully recharged and the delay feature is accordingly recycled.

The fault detector 100 includes, in addition to the monitoring means 110, means 120 responsive to the production of the output signal on line 116 for automatically reducing the level of field excitation and means 124 responsive to the same event for activating a suitable alarm. As is shown in FIG. 3, the latter means is a light emitting diode, and the field reducing means comprises a relay whose operating coil 120a is connected, in series with the light emitting diode 124, to the collector of a normally turned off NPN transistor Q6. The emitter of transistor Q6 is connected directly to the common bus 81, and the base electrode of this transistor is connected through a resistor 118 to the line 116, whereby the transistor Q6 is turned on by the above-described output signal when produced on line 116. The light emitting diode 124 is connected through a resistor 125 to the positive supply voltage terminal, and it is shunted by a free wheeling diode 126, as is the operating coil 120a. The operating coil 120a is energized and the light emitting diode 124 is activated whenever the transistor Q6 is turned on by the output signal on line 116.

Energization of the operating coil of the field reducing relay 120 causes a movable contact 122 of this relay to move from a normal low position in which it engages a terminal 123 to a picked up or high position in which it engages a contact 121 which is connected to the collector of the transistor Q6, thereby completing a holding circuit across the transistor Q6. This holding circuit maintains the operation coil 120a and the light emitting diode 124 energized until released by the subsequent operation of suitable reset means which is shown as a normally open, momentarily closable manual switch 128 connected in parallel with these elements.

The terminal 123 of the field reducing relay 120 is connected by way of remote circuit components indicated symbolically in FIG. 3 by the dashed line 130 to the operating coil 105a of an external exciter field relay 105, and the coil 105a is connected in turn to the +74 volts bus 80 of the exciter field power source. Since the movable contact 122 is normally in its low position, the operating coil of the exciter field relay 105 is normally energized, and consequently the movable contacts 102, 106, and 108 of the latter relay are normally in their high positions. However, as soon as the contact 122 is moved to its high position by operation of the field reducing relay 120, the energizing circuit for coil 105a is opened and the now deenergized exciter field relay 105 drops out, thereby moving contacts 102, 106, and 108 to their respective low positions which complete a reduced excitation circuit 104 for the exciter field winding 74. The reduced excitation circuit 104 comprises terminal 103 which is engaged by the movable contact 102 in its low position, a resistor 131, a terminal 107 which is engaged by the movable contact 106 in its low position, a portion of a load control potentiometer 132 including the wiper arm of this potentiometer, and a terminal 109 which is connected to the common bus 81 by way of the movable contact 108 in its low position. The resistor 131 introduces sufficient resistance in series with the exciter field 74 (FIG. 2) to reduce the field excitation by a desired amount (e.g., 50%), and when the reduced excitation circuit is in effect it provides limited propulsion power for operation of the vehicle to a maintenance point under control of the diesel engine governor system to which the wiper arm of the potentiometer 132 is coupled.

The above-described fault detector operates in response to a potentially harmful overexcitation condition caused by the field switch Q4 losing its normal pulsing action and staying on continuously. The field switch can become continuously conductive if it were to fall in a shorted mode, if the companion transistor Q3 were to fall in a shorted mode, or if the control signal on line 85 (FIG. 2) were to cease pulsing and to remain continuously high. The latter situation can be the result of a failure or malfunction of the modulator 90 or of other parts of the controls, or it can be the result of an overdriven error voltage at the comparison junction J. An overdriven error voltage is one which has a larger (more negative) magnitude than the aforesaid predetermined large negative error voltage and which consequently is outside the aforesaid active range of error voltages, and it can occur for a variety of different reasons, including an untoward increase in the reference signals in the excitation control panel 31 (FIG. 1) due to either a fault in the reference circuits or an erroneous setting of their values, or an untoward loss of the feedback signals due to either a failure in the feedback lines or an interruption in the excitation circuit of the exciter field or of the main generator field. The last-mentioned events will happen if the excitation circuit is opened either accidentally by a failure or deliberately by a contact (not shown) which may be provided in series with the exciter field 74 and which is operated in response to a short-term disturbance such as wheel slip or coasting down. The previously-described time delay feature of the fault detector 100 is intended to ride through such a disturbance which does not reflect a real overexcitation condition and which is only temporary in duration.

If it were desired to disable the fault detector 100 during a maintenance procedure or at any other time, the transistor Q5 in the monitoring means 110 can be continuously forward biased by applying a relatively positive potential to a terminal 134 which is connected through a diode 135 to the juncture of the capacitor 111 and the base resistor 115.

While a preferred form of the invention has been herein shown and described by way of illustration, modifications and variations therein will probably occur to persons skilled in the art. It is therefore intended by the concluding claims to cover all such changes and modifications which fall within the true spirit and scope of this invention.

What we claim as new and desire to secure by Letters Patent of the United States in:

1. In a traction vehicle propulsion system, the improvement comprising rotating dynamoelectric generating means having excitation means comprising a field winding, means connecting said field winding for energization to a source of relatively constant power, switching means connected in series with said field winding, means for normally switching said switching means cyclically between conductive and non-conductive states and for varying between predetermined relatively large and small extremes the per cycle proportion of time that said switching means is conducting so as to vary the level of field excitation as desired between predetermined normal maximum and minimum limits, respectively, said large extreme being less than all of a cycle, and monitoring means connected across said switching means and operative whenever said switching means is continuously conductive for producing an output signal indicative of an overexcitation condition.

2. The improvement as set forth in claim 1 wherein said monitoring means includes means for delaying the production of said output signal until said switching means has been continuously conductive for at least a predetermined length of time.

3. The improvement of claim 1 for a traction vehicle propulsion system wherein said switching means comprises a transistor.

4. The improvement as set forth in claim 1 and further comprising means reponsive to the production of said output signal for automatically reducing the level of field excitation.

5. An improved electrical overload responsive scheme for a traction vehicle propulsion system which includes a rotating dynamoelectric machine having excitation means comprising a field winding, intermittently conductive switching means, and means for connecting said field winding in series with said switching means to a source of relatively constant electric power whereby the level of excitation can be varied as desired between predetermined normal maximum and minimum limits by suitably controlling the proportion of time that said switching means is conductive, wherein the improvement comprises monitoring means connected across said switching means and operative whenever said switching means is continuously conductive for producing an output signal indicative of an overexcitation condition, means responsive to the production of said output signal for automatically reducing the level of field excitation, and means for controlling the reduced level of field excitation.

6. The overload responsive scheme as set forth in claim 5 wherein said monitoring means includes means for delaying the production of said output signal until said switching means has been continuously conductive for at least a predetermined length of time which is appreciably longer than each of the intermittent conductive periods of said switching means at said predetermined normal maximum level of field excitation.

7. The improvement of claim 5 for a traction vehicle propulsion system wherein said switching means comprises a transistor.

8. An improved electrical overload detecting scheme for a traction vehicle propulsion system which includes a rotating dynamoelectric machine having excitation means comprising a field winding connected for energization to a source of relatively constant electric power and a variable impedance means connected in series with said field winding to vary the level of excitation as desired between predetermined normal maximum and minimum limits, wherein the improvement comprises monitoring means connected across said variable impedance means and operative whenever said variable impedance means continuously has such a low impedance condition that field excitation can exceed said predetermined normal maximum level for producing an output signal indicative of an overexcitation condition, said monitoring means comprising a capacitor, first circuit means including a first resistance connecting said capacitor in parallel with said variable impedance means so that said capacitor can accumulate a charge from the voltage across said variable impedance means when in a relatively high impedance condition, second circuit means for discharging said capacitor, said second circuit means including a second resistance having an ohmic value appreciably higher than that of said first resistance, whereby the capacitor discharging time constant is appreciably longer than the capacitor charging time constant, and means connected to said second circuit means for producing said output signal in response to the capacitor charge decreasing to a predetermined low level.

9. An improved electrical overload detecting scheme for a traction vehicle propulsion system which includes a rotating dynamoelectric machine having excitation means comprising a field winding, intermittently conductive switching means, and means for connecting said field winding in series with said switching means to a source of relatively constant electric power whereby the level of excitation can be varied as desired between predetermined normal maximum and minimum limits by suitably controlling the proportion of time that said switching means is conductive, wherein the improvement comprises monitoring means connected across said switching means and operative whenever said switching means is continuously conductive for producing an output signal indicative of an overexcitation condition, said monitoring means comprising a capacitor, first circut means including a first resistance for connecting said capacitor in parallel with said switching means so that said capacitor can accumulate a charge from the voltage across said switching means when not conductive, second circuit means for discharging said capacitor, said second circuit means including a second resistance having an ohmic value appreciably higher than that of said first resistance, whereby the capacitor discharging time constant is appreciably longer than the capacitor charging time constant, and means connected to said second circuit means for producing said output signal in response to the capacitor charge decreasing to a predetermined low level.

* * * * *